Patented Mar. 12, 1940

2,192,894

UNITED STATES PATENT OFFICE 2,192,894

INSECTICIDE

Thomas S. Carswell, Kirkwood, Mo., assignor to Monsanto Chemical Company, St. Louis, Mo., a corporation of Delaware No Drawing. Application November 23, 1936, Serial No. 112,281

12 Claims. (Cl. 167—30)

The present invention relates to insecticides, specifically to a series of compounds which have proven especially effective as contact poisons for the control of insect pests.

A great variety of compositions have proved useful as contact poisons for the control of insect pests. Perhaps the most widely used of these compositions have such substances as pyrethrum and rotenone as their basic constituents. More recently compositions having cyclohexylamines and N-alkylated cyclohexylamines as their active components have been suggested. The use of nicotine, pyrethrum, derris and rotenone is limited by economic considerations whereas the cyclohexylamine derivatives heretofore suggested have no demonstrated sufficiently powerful activity for the control of certain insects.

The present invention has as its aim the provision of a series of compounds of great insecticidal activity whose use will not be limited by the objections mentioned. Furthermore, it is an object of the invention to provide insecticidal substances of great effectiveness in the control of various refractory insects, for example, aphids and red spiders.

The invention is based upon the discovery that amides of the general formula

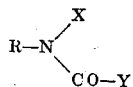

in which R is a monovalent monocyclic hexahydrogenated aromatic hydrocarbon radical and X and Y are monovalent hydrocarbon radicals, such as N-2-ethylhexyl-N-acetyl-cyclohexylamine and similar N-alkyl-N-acyl-cyclohexylamines, as well as N-aryl-N-acyl-cyclohexylamines, N-alkyl-N-aroyl-cyclohexylamines and N-aryl-N-aroyl-cyclohexylamines, are powerful contact poisons for the red spider, *Tetranychus telarius* (Linné). These compounds are distinguished from the hitherto known alkylated cyclohexylamine derivatives by the presence of an acyl group on the nitrogen atom of the cyclohexylamine. It is to this acyl group that the superiority of the products is attributable The preparation of these compounds, their effectiveness toward other insects, and the method of using them are more completely described hereinafter The general method of preparing the N-alkyl-N-acyl-cyclohexylamines consists in alkylating cyclohexylamine by means of an alkyl chloride, alkyl sulfate, or similar alkylating agent. Secondary and tertiary, as well as primary alkyl halides or sulfates may be used to obtain the corresponding alkyl cyclohexylamine. The resulting compound is then acylated with an acid, acid anhydride, acid chloride or similar acylating agent, to yield the corresponding acyl derivative. Acylating agents in which the acyl group is an aroyl group, for example, benzoyl chloride, also react to yield the corresponding aroyl derivative. Similarly, like cyclohexylamine, homologues of cyclohexylamine react by this general method to yield the corresponding homologous derivatives. In the preparation of these compounds the acylation may precede the alkylation. Examples of these general methods of making representative compounds of the invention follow.

*Example I.*—N-acetyl-N-n-butyl-cyclohexylamine is a typical example of a compound of this class and a convenient method of preparing it is as follows: To 1300 kg. of cyclohexylamine was added with agitation and under a reflux condenser at a temperature near the boiling point, 200 kg. of normal butyl chloride, at approximately the rate at which it is taken up in the reaction. This rate in general is fairly slow, though it may be increased or decreased in accordance with the degree of agitation or thoroughness of distribution of the butyl chloride in the mixture. The temperature of reaction and the agitation preferably were maintained for a period of about 2½ hours after the completion of the addition of butyl chloride. The reaction mixture was then cooled until crystals appeared. At the beginning of the separation of the crystalline product, about 200 kg. of a 50% solution of sodium hydroxide was diluted and added. The mixture was agitated in order to insure thorough distribution and transferred to a suitable separating device and agitated thoroughly. After allowing the mixture to separate into layers, the water layer was drawn off. To effect complete removal of all hydrochloric acid present in the oil, there was added a little of a solution (e. g., 25% solution) of sodium hydroxide and the mixture was further agitated. If any water layer tended to separate, this was also drawn off.

Most of the butyl-cyclohexylamine was obtained as a fraction boiling at about 80° C. under a vacuum of 10 mm. This fraction was then redistilled. The butyl-cyclohexylamine fraction came over between 84° and 85° C. under a vacuum of about 12 mm. The alkylation of cyclohexylamine can also be carried out conveniently in an autoclave.

The acetylation of the product was effected by agitating 100.5 kg. of the normal-butyl-cyclohexylamine prepared as above described with 75 kg. of acetic anhydride of 98% purity, while cooling the mixture. The reaction mixture was then gradually heated to 110° C. and held at that temperature for ½ hour. Five additional kilograms of anhydride were added, and the temperature held at 110° C. for 1½ hours. The reaction product was poured into cold water and stirred therewith. The resultant liquid was transferred to a separatory tank and the aqueous fraction which separated was drawn off. The aqueous layer was extracted with benzene and the benzene was added to the oily layer which constituted the main reaction product. The mixture was then agitated with water, left to settle over night, washed twice with dilute hydrochloric acid and then twice with water. Next the washed product was purified by vacuum distillation.

*Example II.*—Homologous compounds may be prepared by replacing cyclohexylamine in the above example with 1495 kg. of any of the completely hydrogenated isomeric (ortho, meta or para) toluidines or their mixtures, and proceeding substantially as above described.

*Example III.*—Preparation of N-acetyl-N-amylcyclohexylamine.—About 1300 kg. of cyclohexylamine were agitated under a reflux condenser and at approximately the boiling point with 230 kg. of a primary amyl chloride until reaction was complete. This may conveniently be determined by a test for combined chlorine in a sample of the product, purified by the method employed to purify the crude butyl-cyclohexylamine. The purified product was acetylated in accordance with the method outlined for acetylation of N-butylated cyclohexylamine.

*Example IV.*—Preparation of N-formyl-N-n-butyl-cyclohexylamine. To 1300 kg. of cyclohexylamine maintained at or near the boiling point under a reflux condenser are added with stirring 200 kg. of normal-butyl chloride at approximately the rate at which it is taken up in the reaction. In general, this rate is fairly slow, though it may be increased or decreased in accordance with the degree of agitation or thoroughness of distribution of the butyl chloride in the mixture. Gentle refluxing and stirring are maintained for a period of about 2½ hours after the completion of the addition of the butyl chloride. The reaction mixture is then cooled until crystals begin to appear, at which point 200 kg. of a 50% by weight aqueous solution of sodium hydroxide diluted with approximately an equal volume of water are added with stirring to insure thorough distribution. The mixture is transferred to a suitable separating device or vessel provided with a bottom outlet, and allowed to separate into layers. The aqueous layer is drawn off and the residual oily layer is washed with a small quantity of dilute sodium hydroxide solution.

The N-n-butylcyclohexylamine is recovered by distillation, most of it appearing in the fraction boiling at about 80° C. at a pressure of 10 mm. (about 130° C. at 100 mm.).

The yields obtained by this process correspond to approximately 75% of the theoretical yield from the butyl chloride. Instead of this procedure, the butylation of cyclohexylamine can be effected in an autoclave under pressure or by other well known methods.

The butylcyclohexylamine obtained above need not be further purified for the subsequent formylation. To 155.2 kg. of the compound thus prepared, maintained at a temperature of 60° C. under a reflux condenser, are slowly added with stirring 70 kg. of 85% formic acid (approximately 30% excess) at such a rate that the heat of the reaction is sufficient to maintain a gentle reflux. If desired, the acid can be added more rapidly, if the mixture is stirred vigorously and cooled during the additions. After all the acid is added the reflux is maintained by outside heat for about two hours. The formylated product is distilled directly from the mixture, preferably directly without any cooling after the end of the reflux period so as to utilize the heat already present in the mixture.

The N-formyl-N-n-butylcyclohexylamine is a clear, colorless liquid with a boiling point of approximately 108°–118° at a pressure of 2 mm. (118°–123° at 10 mm.).

The compounds which have been found particularly active as insecticides include compounds having the following general formula:

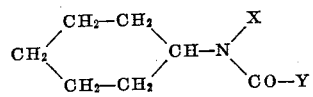

in which X is an alkyl or aryl group or hydrogen, for example, ethyl, isopropyl, n-butyl, amyl, tertiary-amyl, hexyl, n-octyl, iso-octyl (ethyl hexyl), phenyl, benzyl or cyclohexyl and Y is a similar group, for example, the radical CO—Y is an acetyl, propionyl, n-butyryl, valeryl, octoyl, benzoyl or phthalyl. Compounds of powerful insecticidal activity also result when the cyclohexyl residue is substituted by a methyl or other alkyl group, for example, derivatives of C-methyl-cyclohexylamine or hydrotoluidines. When the group represented by X is unsaturated, for example, an allyl group, the compound is also active.

The compounds are especially active insecticides for use against the red spider, *Tetranychus telarius*; the aphid, *Myzus porosus*; the common house fly, *Musca domestica*; the mealy bug, *Pseudococcus citri*; thrips, *Dendrothrips arnatus*; the aphid, *Aphis rumicis*; and the squash bug, *Anasa tristis*. N-amyl-N-benzoyl-cyclohexylamine is especially valuable for the control of leafhoppers, those infesting apple trees as well as those infesting grape vines. Suitable concentrations to use for this purpose are preparations containing about 0.1% of the amylbenzoylcyclohexylamine in an emulsion made with the aid of a sulfonated castor oil or a similar wetting or emulsifying agent. In such uses the compounds of the invention act similarly to materials such as nicotine, pyrethrum, derris, rotenone, and proprietary aliphatic thiocyanates but possess the distinct advantage over such substances in their toxicity.

The compounds of the present invention are characterized also by increased toxicity and specificity in comparison with simple N-alkyl-cyclohexylamines. Thus, in comparative experiments with sprays of N-ethyl-cyclohexylamine and N-ethyl-N-acetyl-cyclohexylamine under exactly comparable conditions the following figures represent the kills at various concentrations when applied to the aphid, *Myzus porosus*:

| N-ethyl-cyclohexylamine | | N-ethyl-N-acetyl-cyclohexylamine | |
|---|---|---|---|
| Concentration | Kill | Concentration | Kill |
| Per cent | Per cent | Per cent | Per cent |
| 0.1 | 3 | 0.1 | 4 |
| 0.16 | 8 | 0.16 | 28 |
| 0.2 | 28 | 0.2 | 64 |
| 0.25 | 44 | 0.25 | 63 |
| 0.33 | 56 | 0.33 | 83 |
| 0.5 | 78 | 0.5 | 94 |

Thus, at all concentrations, the acetylated ethyl-cyclohexylamine is more toxic to *Myzus porosus* than the unacetylated product.

This is further borne out in experiments with sprays for the protection of rose plants from red spider. At a concentration of 0.2%, under comparable conditions, N-2-ethyl-hexyl-cyclohexylamine gives an 80% kill while N-2-ethylhexyl-N-acetylcyclohexylamine gives a 99% kill.

In connection with the action of the compounds of the invention on red spiders the following decreasing order of activity obtains: N-amyl-N-benzoyl-cyclohexylamine, N-ethylhexyl-N-acetyl-cyclohexylamine and N-amyl-N-acetyl-cyclohexylamine. Thus, the activity is determined by both the acyl group and the alkyl group when used for control of this insect. Both the N-ethyl and N-butyl-N-benzoyl-cyclohexylamine are especially effective toward the common house fly, *Musca domestica*. When used in 2% concentration in a spray against house flies, these substances produce a 60% kill in 5 minutes and a 97% kill in 10 minutes.

The compounds may be used in any of the conventional manners. Thus, for example, they can be incorporated in powders or dusts, or in liquids for spraying purposes. The proportions which are to be used in any of these compositions are to some extent dependent upon the type of insect to be killed and the method by which the insecticide is to be distributed and the period in which killing is desired. Thus, used as a spray dissolved in kerosene, for the control of house flies, proportions up to about 5% of the liquid are suitable. In the control of red spider preferably greater proportions are indicated, but for this purpose the kerosene mixture is made into a dilute water emulsion for applications to plants; proportions are adjusted so that the cyclohexylamine is present in the ratio of 1 part to 800 or 1000 parts of emulsion. After the exact conditions have been arrived at, the same formulas can be used without variation since the compounds are substantially pure chemical individuals whose potency does not vary from batch to batch, as is the case with pyrethrum and similar natural products.

Inasmuch as the above description comprises preferred embodiments of the invention it is to be understood that the invention is not to be limited thereto. The specification is illustrative of methods by which the invention may be varied to adapt it to other specific purposes. It is to be understood that the invention comprehends these and other variations which do not depart substantially therefrom and is subject only to the limitations imposed by the appended claims.

What I claim is:

1. An insecticidal composition containing an amide of the general formula

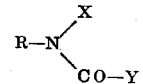

in which R is a monovalent monocyclic hexahydrogenated aromatic hydrocarbon radical and X and Y are monovalent hydrocarbon radicals.

2. An insecticidal composition as defined in claim 1 and further characterized in that R in the general formula is the cyclohexyl radical.

3. An insecticidal composition containing a compound of the general formula:

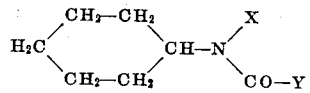

in which X and Y are selected from the class consisting of hydrogen, methyl, ethyl, propyl, butyl, amyl, hexyl, heptyl, octyl, allyl, phenyl, benzyl and cyclohexyl radicals.

4. An insecticidal composition containing an N-alkyl-N-acyl-cyclohexylamine.

5. An insecticidal composition containing an N-alkyl-N-aroyl-cyclohexylamine.

6. An insecticidal composition containing an N-aryl-N-acyl-cyclohexylamine.

7. An insecticidal composition containing an N-alkyl-N-acetyl-cyclohexylamine.

8. An insecticidal composition containing an N-alkyl-N-benzoyl-cyclohexylamine.

9. An insecticidal composition containing an N-phenyl-N-acyl-cyclohexylamine.

10. An insecticidal composition comprising N-ethylhexyl-N-acetyl-cyclohexylamine.

11. An insecticidal composition comprising N-ethyl-N-benzoyl-cyclohexylamine.

12. An insecticidal composition containing an N-phenyl-N-acetyl-cyclohexylamine.

THOMAS S. CARSWELL.